June 2, 1959     H. LOWE     2,888,834
TRANSMISSION
Filed Jan. 11, 1954     2 Sheets-Sheet 1
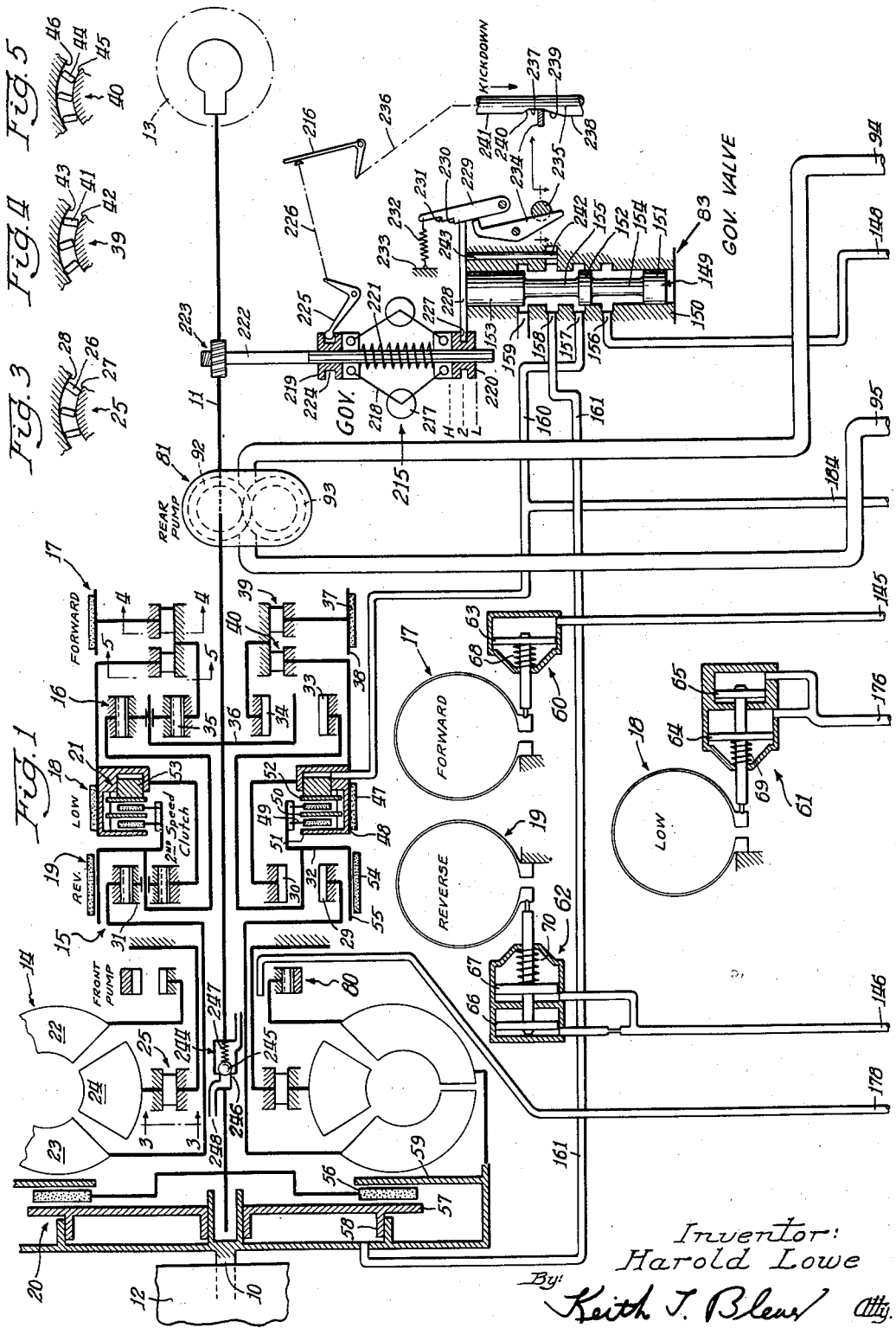
Inventor:
Harold Lowe
By Keith T. Blew Atty.

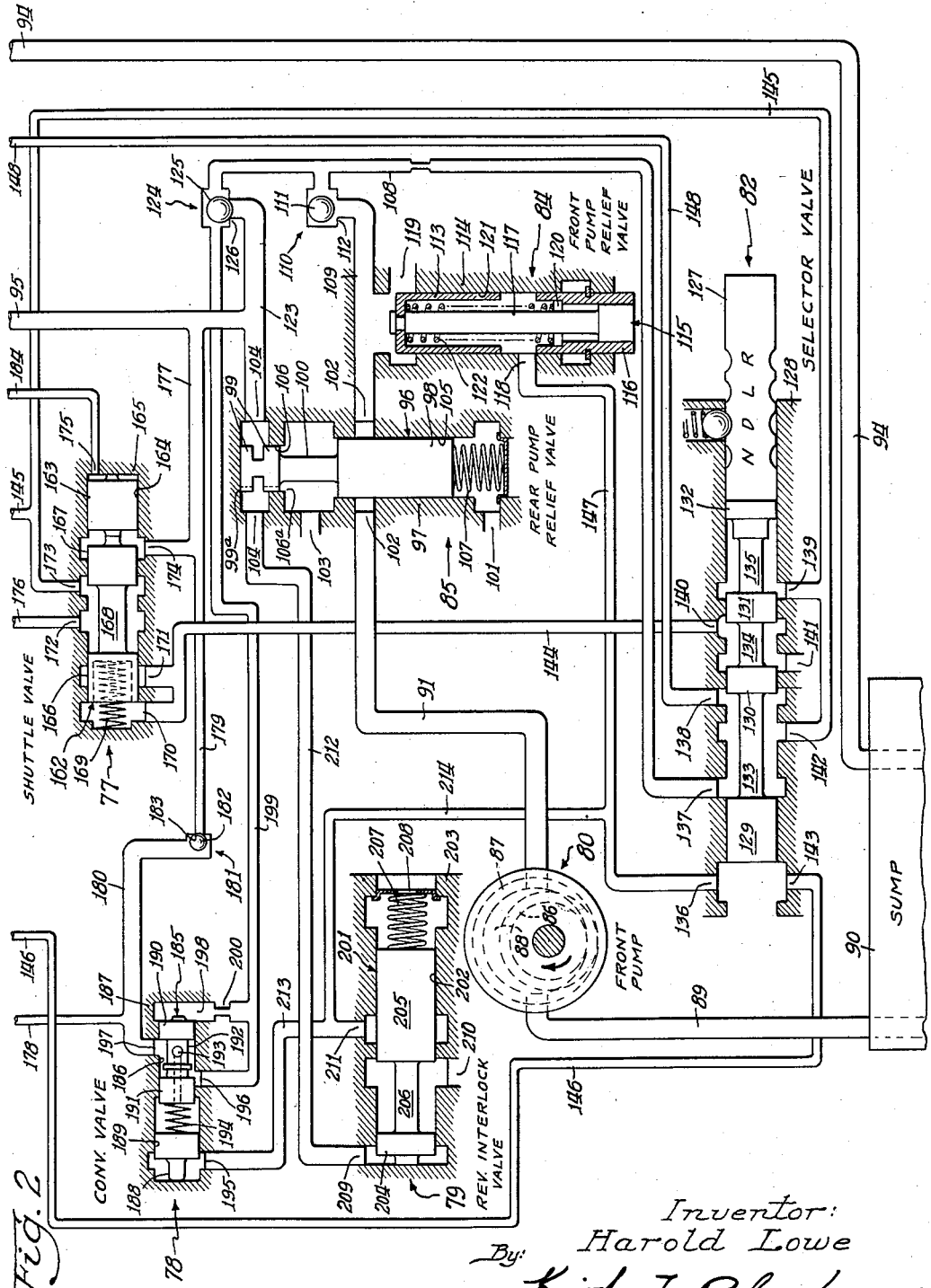

United States Patent Office 2,888,834
Patented June 2, 1959

2,888,834

TRANSMISSION

Harold Lowe, Grosse Pointe Farms, Mich., assignor to Borg-Warner Corporation, Chicago, Ill., a corporation of Illinois Application January 11, 1954, Serial No. 403,169

5 Claims. (Cl. 74—472)

The invention relates to transmissions for automotive vehicles and more particularly to such transmissions providing a plurality of speed ratios.

Such transmissions have in the past quite generally been controlled by governor mechanisms responsive to changes in speed of the vehicle for changing the drive through the transmission from a low speed drive to an intermediate drive and subsequently to a high speed drive as the speed of the vehicle increases. On a decreasing speed of the vehicle, changing of the speed ratio will take place from high speed drive to intermediate speed drive and subsequently to low speed drive. Quite generally, also, these changes both in the increasing and decreasing directions have been made responsive to the position of the accelerator of the vehicle so that, upon partially opened position, the accelerator will tend to hold the transmission in a lower speed ratio or will tend to change the transmission from a higher to a lower speed ratio, the accelerator opposing and balancing the effect of the governor in this respect.

It is an object of the present invention to so connect the governor and accelerator with interlocking mechanism that the governor may be effective to cause a change from a higher speed ratio to a lower speed ratio, specifically from high speed forward drive to intermediate speed forward drive and also from intermediate forward drive to low speed forward drive, when the accelerator is in a released or closed throttle position but not when the accelerator is in a partially open throttle position. It is contemplated that the arrangement may be such that the transmission may be changed from its high speed ratio to its intermediate speed ratio also when the accelerator is moved to an open throttle kick-down position, but such a kickdown is preferably not provided for downshifting from intermediate speed ratio to low speed ratio.

The invention consists of the novel constructions, arrangements and devices to be hereinafter described and claimed for carrying out the above-stated objects and such other objects as will appear from the following description of a preferred embodiment of the invention, illustrated with reference to the accompanying drawings, wherein:

Fig. 1 is a schematic illustration of a transmission for installation in an automotive vehicle and a portion of a controlling system for the transmission which embodies the interlock mechanism for holding the transmission in its higher speed ratios embodying the principles of the invention;

Fig. 2 is a schematic illustration of the remainder of the transmission controlling system adapted to be connected to the portion of the system shown in Fig. 1; and Figs. 3, 4 and 5 are sectional views taken respectively on lines 3—3, 4—4 and 5—5 in Fig. 1 in the directions indicated.

Like characters of reference designate like parts in the several views.

Referring now to the drawings, the transmission illustrated comprises a drive shaft 10 and a driven shaft 11.

The drive shaft 10 is adapted to be driven by the engine 12 of the vehicle in which the transmission is installed, and the driven shaft 11 is adapted to drive the rear road wheels 13 of the vehicle through any suitable drive connections.

The transmission comprises in general a hydraulic torque converter 14, a planetary gear set 15, a second planetary gear set 16, a forward drive brake 17, a low speed lockup brake 18, a reverse brake 19, a high speed forward drive clutch 20 and an intermediate speed clutch 21.

The hydraulic torque converter 14 comprises a bladed impeller 22, a bladed runner or driven element 23 and a bladed stator or reaction element 24. The impeller is connected to be driven from the drive shaft 10. The stator 24 is connected to a one-way brake 25 which is effective for holding the stator 24 against rotation in the reverse direction, that is, in the direction of rotation opposite to that of the drive shaft 10. The brake 25 may be of any suitable construction and may, for example, comprise tiltable sprags 26 disposed between and engageable with inner and outer cylindrical raceways 27 and 28 as shown in Fig. 3.

The planetary gear set 15 comprises a ring gear 29, a sun gear 30, a plurality of planet gears 31 in mesh with the sun and ring gears and a planet gear carrier 32 for the planet gears 31. The second planetary gear set 16 comprises a ring gear 33, a sun gear 34, a plurality of planet gears 35 in mesh with the sun and ring gears and a planet gear carrier 36. The ring gear 29 of the first planetary gear set is connected to be driven by the runner 23 of the torque converter 14, and the planet gear carrier 32 of this gear set is connected with the ring gear 33 of the second planetary gear set 16. The planet gear carrier 36 of the second gear set is connected with the driven shaft 11.

The friction brake 17 comprises a brake band 37 engageable with a drum 38, and the brake 17 is effective through a one-way brake 39 for braking the sun gear 34 and is effective through a second one-way brake 40 as well as the first one-way brake 39 disposed in series with the brake 40 for braking the sun gear 30. The one-way brakes 39 and 40 may be of any suitable well-known construction and may be of the sprag type similar to the brake 25. The one-way brake 39 comprises sprags 41 engageable with inner and outer cylindrical surfaces 42 and 43, and the brake 40 comprises sprags 44 engageable between inner and outer cylindrical races 45 and 46. Looking in the same direction at the brakes 39 and 40, the sprags of the two brakes are disposed in opposite directions between the inner and outer races as is apparent from Figs. 4 and 5.

The brake 18 comprises a brake band 47 engageable on a brake drum 48 for augmenting the braking action of the one-way brakes 39 and 40 and the friction brake 17 on the sun gear 30. The friction clutch 21 comprises discs 49 rotatable with the planet gear carrier 32, discs 50 rotatable with the sun gear 30, opposite pressure plates 51 and 52, and a fluid pressure actuated piston 53 for moving the plate 52 toward the plate 51 to frictionally engage the two sets of friction discs with each other for engaging the clutch 21.

The reverse brake 19 comprises a brake band 54 engageable with a brake drum 55 connected with the carrier 32 of the planetary gear set 15 and with the ring gear 33 of the planetary gear set 16. The clutch 20 comprises a clutch disc 56 connected with the driven shaft 11 and an axially movable pressure plate 57 having a fluid pressure actuated piston portion 58 and an axially stationary pressure plate 59 both rotatable with the drive shaft 10 and between which the disc 56 is engaged.

Each of the brakes 17, 18 and 19 is engaged by a fluid pressure actuated servomotor, the brakes 17, 18 and 19 being respectively engaged by servomotors 60, 61 and 62. The servomotor 60 comprises a fluid pressure actuated piston 63 for engaging the brake band 37 on the drum 38; the servomotor 61 comprises fluid pressure actuated pistons 64 and 65 for engaging the brake band 47 on the drum 48; and the servomotor 62 comprises pistons 66 and 67 for engaging the brake band 54 on the drum 55. Return springs 68, 69 and 70 are provided in the motors 60, 61 and 62 respectively for disengaging the bands from the drums.

In operation, the transmission provides low, intermediate and direct forward speed drives and a drive in reverse. The transmission, when the clutches 20 and 21 and the brakes 17, 18 and 19 are all disengaged is in a neutral condition, and the shaft 11 is not driven from the shaft 10 when the latter is rotated from the engine 12. The low speed forward drive is completed when the brake 17 is engaged, and the brake 18 may also be engaged for this drive for helping the brake 17 take the reaction from the gearing. The sun gear 34 is braked from rotation by means of the friction brake 17 and the one-way brake 39, and the sun gear 30 is braked through the one-way brake 40 from the sun gear 34. When the brake 18 is also engaged, this brake also brakes the sun gear 30.

The runner 23 in the torque converter 14 is driven through the medium of the fluid in the torque converter from the impeller 22 and the drive shaft 10. As is well known in connection with such hydraulic torque converters, the torque output from such a converter is initially very high under stall conditions when the runner is stationary, and the torque output of the torque converter decreases gradually as the speed of the runner increases. It is usual with such converters that the torque multiplication may initially be about 2.2:1, for example, and decrease to 1:1 with increases in runner speed.

The runner 23 drives the ring gear 29 of the gear set 15. The sun gear 30 of this gear set is braked to be stationary, as has just been described, and the planet gears 31 planetate between the sun gear 30 and ring gear 29 to drive the carrier 32 at a reduced speed and increased torque in the forward direction. The ring gear 33 of the second planetary gear set 16 is connected with the carrier 32 and is driven thereby. The sun gear 34 of the gear set 16 is braked to be stationary, as has just been described, and the planet gears 35 of this gear set planetate between the ring gear 33 and the sun gear 34 and drive the planet gear carrier 36, which is connected with the driven shaft 11, at a further reduced speed and increased torque in the forward direction. The driven shaft 11 is thus driven at an increased torque with respect to that impressed on the drive shaft 10, an increase in torque taking place in each of the hydraulic torque converter 14, the planetary gear set 15 and the planetary gear set 16.

Intermediate speed forward drive through the transmission is completed by disengaging the brake 18 and engaging the clutch 21. The clutch 21 connects together the planet gear carrier 32 and the sun gear 30 of the planetary gear set 15 thereby locking up the gear set and causing all of its elements to rotate together as a unit. The ring gear 33 of the second planetary gear set 16 is thereby driven from the runner 23 at the same speed as the runner, and the speed of the driven shaft 11 is thereby increased with respect to its speed in low speed forward drive.

Direct drive through the transmission is completed by engaging the clutch 20 which directly connects together the drive shaft 10 with the driven shaft 11. Both the clutch 21 and the brake 17 may be allowed to remain in engaged condition for this drive.

Reverse drive is completed through the transmission by engaging the reverse brake 19. The brake 19 functions to hold stationary the planet gear carrier 32 of the gear set 15 and the ring gear 33 of the gear set 16 connected with the carrier 32. The ring gear 29 is driven as in the forward drives through the hydraulic torque converter 14 from the drive shaft 10, and the sun gear 30 is driven at a reduced speed in the reverse direction through the intermediary of the planet gear pinions 31 held against planetary rotation about the centers of the shafts 10 and 11 by the brake 19. The sun gear 30 drives the sun gear 34 of the planetary gear set 16 through the one-way brake 40 which now functions as a clutch. The ring gear 33 of the gear set 16 being held stationary by the reverse brake 19 functions as the reaction element of the gear set 16 to cause a drive of the planet gear carrier 36 and thereby the driven shaft 11 in the reverse direction at a speed which is reduced below the speed of the sun gear 30 due to the action of the planet gear pinions 35 rotating within the ring gear 33.

The control mechanism for the transmission comprises in general a shuttle valve 77, a converter valve 78, a reverse interlock valve 79, a pump 80 driven by the drive shaft 10 of the transmission, a pump 81 driven by the driven shaft 11 of the transmission, a manual selector valve 82, a governor valve 83, a front pump relief valve 84 and a rear pump relief valve 85.

The drive shaft pump 80 comprises an inner gear 86 driven through the intermediary of the impeller 22 of the torque converter 14 from the drive shaft 10 and an outer gear 87 eccentrically located with respect to the inner gear 86 and in mesh with the latter gear. A crescent shaped casing portion 88 separates the gears 86 and 87, as shown. The pump 80 is connected with an inlet conduit 89 and thereby with a fluid sump 90, and the pump is also connected with an outlet conduit 91. The pump is of a well-known construction and operates as is well understood to pump fluid from the conduit 89 to the conduit 91 when the inner gear 86 is rotated in the direction indicated by the arrow on the gear and the outer gear 87 rotates in the same direction due to its meshing engagement with the gear 86, the pumping action being due to the fluid carried by the gears 86 and 87 across the inner and outer faces of the crescent shaped casing portion 88.

The driven shaft pump 81 comprises a gear 92 driven by the driven shaft 11 in mesh with a gear 93. The pump 81 is connected with an inlet conduit 94 which is connected to draw fluid out of the sump 90, and the pump is connected with an outlet conduit 95. The pump 81 also is of well-known construction and operation, carrying fluid between its gear teeth to provide its pumping action.

The outlet conduit 91 of the drive shaft pump 80 is connected with the rear pump relief valve 85, as shown. The valve 85 comprises a piston 96 slidably disposed in a casing portion 97. The piston 96 has lands 98 and 99 and a groove 100 between the lands. The casing portion 97 is provided with a port 101, two connected ports 102, a port 103 and two connected ports 104, as shown, and it has connected cavities 105 and 106 of respectively larger and smaller diameters in which the lands 98 and 99 are respectively slidable. A compression spring 107 is provided between the lower end of the piston 96 and the lower end of the cavity 105.

A regulated fluid pressure supply conduit 108 is connected by means of a branch conduit 109 with the ports 102 and the outlet conduit 91 for the pump 80. A check valve 110 comprising a ball 111 adapted to rest on a seat 112 is provided in the conduit 109 for allowing fluid to flow through the conduit in only one direction. The ports 101 and 103 of the valve 85 are bleed ports adapted to freely discharge fluid into the sump 90.

The front pump relief valve 84 is connected with the conduit 109, as shown, and comprises a hollow piston 113 slidably disposed in a casing portion 114. A piston 115 is slidably disposed in a bushing 116 fixed within the casing portion 114 and is connected by a reduced diameter stem portion 117 with the piston 113. The casing portion 114 has ports 118 and 119, as shown, the port 119 being a bleed port for freely discharging fluid into the sump 90. The bushing 116 and the casing portion 114 have connected cavities 120 and 121 of respectively smaller and larger diameters in which the pistons 115 and 113 are respectively slidable, and the cavity 121 at its upper end is connected to the conduit 109. A spring 122 is provided between an internal ridge in the bushing 116 and the inner end of the piston 113.

The outlet conduit 95 for the pump 81 is connected with one of the ports 104 in the valve 85 by means of a branch conduit 123, and the conduit 95 is also connected with the regulated pressure conduit 108 by means of the branch conduit 123. A check valve 124 is provided in the conduit 123 and comprises a ball 125 adapted to rest on a seat 126.

The regulated fluid pressure conduit 108 is connected with the manual selector valve 82. The valve 82 comprises a valve piston 127 slidably disposed in a casing portion 128. The piston 127 is provided with lands 129, 130, 131 and 132 and grooves 133, 134 and 135 between the lands. The casing portion is provided with ports 136, 137, 138, 139, 140, 141, 142 and 143. The port 141 is a bleed port through which fluid may freely discharge into the sump 90, and the port 137 is connected with the regulated fluid pressure conduit 108. The port 140 is connected by means of a conduit 144 with the shuttle valve 77 as will hereinafter be more fully described. The ports 139 and 142 are connected by means of a conduit 145 with the brake servomotor 60 for applying pressure at times to the piston 63, and the port 143 is connected by means of a conduit 146 with the brake servomotor 62 for applying pressure to the pistons 66 and 67. The port 136 is connected to the port 118 in the front pump relief valve 84 by means of a conduit 147.

The port 138 in the selector valve 82 is connected by means of a conduit 148 with the valve 83. The valve 83 comprises a valve piston 149 slidably disposed in a casing portion 150. The piston 149 is provided with lands 151, 152 and 153 and grooves 154 and 155 between the lands. The casing portion 150 is provided with ports 156, 157, 158 and 159. The port 159 is a bleed port adapted to freely discharge fluid into the sump 90; the port 156 is connected with the conduit 148; the port 157 is connected by means of a conduit 160 with the pressure piston 53 of the friction clutch 21; and the port 158 is connected by means of a conduit 161 with the pressure plate piston portion 58 of the friction clutch 20.

The shuttle valve 77 comprises pistons 162 and 163 slidably disposed in a cylindrical cavity 164 provided in a casing portion 165. The piston 162 is formed with lands 166 and 167 separated by a groove 168, and the piston 162 is provided with a hollow in one end in which a compression spring 169 is provided. The spring 169 extends between the left end of the cavity 164 and the inner end of the hollow in the piston 162.

The casing portion 165 is provided with ports 170, 171, 172, 173, 174 and 175. The ports 170 and 171 are connected to the conduit 144; the port 172 is connected by means of a conduit 176 with the servomotor 61 for applying fluid pressure behind the pistons 64 and 65; the port 173 is connected with the conduit 145; and the port 174 is connected with the outlet conduit 95 from the driven shaft pump 81 by means of a branch conduit 177 and is connected with a supply conduit 178 for the torque converter 14 by means of branch conduits 179 and 180. A check valve 181 is provided between the branches 180 and 179 and comprises a ball 182 adapted to rest on a seat 183. The branch conduit 179 is relatively restricted, due to the reduced diameter, as is shown. The port 175 is connected by means of a conduit 184 with the conduit 160.

The converter valve 78 comprises a valve piston 185 slidably disposed in a cylindrical cavity 186 provided in a casing portion 187 and a piston 188 slidably disposed in a connected cylindrical larger diameter cavity 189. The piston 185 is provided with lands 190 and 191 separated by a restricted portion 192, and a passage 193 is provided from the portion 192 to the left end of the piston 185 as shown. A compression spring 194 is provided between the piston 185 and the piston 188.

The casing portion 187 is provided with ports 195, 196, 197 and 198. The ports 196 and 198 are connected by means of a conduit 199 with the pressure supply conduit 108, and a restriction 200 is provided in connection with the port 198 as shown. The port 197 is connected with the converter supply conduit 178.

The reverse interlock valve 79 comprises a piston 201 slidably disposed in a cylindrical cavity 202 provided in a casing portion 203. The piston 201 is provided with lands 204 and 205 separated by a groove 206. A compression spring 207 is provided between the right end of the piston 201 and a spring retainer 208 fixed in an end of the cavity 202. The casing portion 203 is provided with ports 209, 210 and 211. The port 209 is connected by means of a conduit 212 with one of the ports 104 of the rear pump relief valve 85; the port 210 is a bleed port adapted to freely discharge into the sump 90; and the port 211 is connected by means of a conduit 213 with the port 195 of the converter valve 78 and by means of a branch conduit 214 with the conduit 147.

The valve piston 149 is moved between its various positions by means of the combined influence of a governor 215 and the accelerator 216 of the vehicle. The governor 215 comprises fly balls 217 connected by links 218 with hubs 219 and 220 which are separated by a compression spring 21 and are splined and slidable on a shaft 222. The shaft 222 is driven in timed relationship with the driven shaft 11 of the transmission by means of gearing 223. The hub 219 has a slot 224 formed therein for receiving one end of a bell crank 225 actuated through a link 226 from the accelerator 216. The hub 220 is formed with a slot 227 receiving a bar 228 fixed to the piston 149 for transmitting the movement of the hub 220 on the shaft 222 to the piston 149.

In brief, the governor 215 moves the valve piston 149 upwardly as seen in Fig. 1 as the speed of the vehicle increases, from its low or "L" speed position to its second or "2" speed position and thence to its high or "H" speed position. A latch 229 is provided for holding the valve piston 149 in its second or "H" speed positions, the latch being provided with lands 230 and 231 on which the bar 228 may rest once the valve piston 149 and bar 228 have moved into their second or "H" speed positions. A tension spring 232 acts between a stationary part 233 and the latch 229 tending to hold the lands 230 and 231 beneath the bar 228 once the bar and valve piston 149 have moved sufficiently.

A pivoted lever 234 has one end effective on the latch 229 tending to move the latch about its pivot against the action of the spring 232 to release the bar 228 and piston 149. The lever 234 has effective on the other of its ends a rod 235 which is connected by any suitable linkage 236 with the accelerator 216, so that, as the accelerator is depressed to open the vehicle throttle, the rod 235 is moved downwardly as seen in its extreme right hand showing in Fig. 1, while when the accelerator is released to close the vehicle throttle, the rod 235 is moved upwardly.

The lever 234 is adapted to rest in a slot 237 formed in the rod 235. A relatively high land 238 is provided on one end of the slot 237, and the slot is defined by a cam portion 239 extending between the lowest part of the slot 237 and the land 238 and also by a slanted cam portion 240 on the other end of the slot 237 which extends between the lowest part of the slot 237 and a land 241 of less height than the land 238.

A small diameter piston 242 is slidably disposed in a cylindrical cavity 243 in the casing portion 150 and has its lower end in communication with the port 158. The piston 242 acts, as will be more particularly described hereinafter, to yieldably hold the bar 228 and piston 149 in their high speed positions once fluid under pressure is present in the port 158.

A restricted outlet is provided for the fluid pressure in the torque converter 14. This is shown as taking the form of a check valve 244 comprising a ball 245 pressed on a seat 246 by a spring 247. The check valve 244 is in a restricted passage 248 leading from the torque converter 14 to various parts of the transmission which require lubrication. The spring 247 in the check valve is sufficient for maintaining a predetermined low pressure, such as five lbs. per square inch, within the torque converter when the system is inoperative to assure that the torque converter remains full of fluid.

The operation of the transmision and its controls as so far described is as follows: The transmission is conditioned for various types of operation by moving the manually operated selector valve piston 127 into any of its various positions which are the "N" or neutral position, the "D" or drive range position, the "L" or low range position and the "R" or reverse drive position, all of which are indicated in the drawing. When the valve piston 127 is in its "N" or neutral position, there is no drive between the shafts 10 and 11. It is assumed that the vehicle engine 12 is in operation, and the pump 80 which is driven through the impeller 22 from the drive shaft 10 draws fluid from the sump 90 through the conduit 89 and discharges it into the conduit 91. It flows between the opposite ports 102 in the valve 85 and through the conduit 109 into the regulated fluid pressure supply conduit 108. The check valve 110 is opened by the fluid from the pump 80 with the ball 111 being moved off the seat 112 to provide communication through the conduit 109 to the conduit 108. The pressure in the conduits 109 and 108 is maintained at a predetermined maximum by means of the front pump relief valve 84. The pressure in the conduit 109 is impressed on the upper end of the valve piston 113 and moves the valve piston 113 into substantially its illustrated port cracking position in which the piston 113 allows fluid from the conduit 109 to flow through the bleed port 119 and thereby to the sump 90, this movement of the valve piston 113 into port cracking position being against the action of the spring 122. As will be apparent, a decrease in fluid pressure in the conduit 109 will allow the piston 113 to move upwardly under the influence of the spring 122 to decrease the port cracking effect of the piston 113, and an increase in the fluid pressure in the conduit 109 functions to move the valve piston 113 farther downwardly against the action of the spring 122 to increase the port cracking effect of the piston 113, so that the net effect of the valve 84 is to maintain the fluid in the conduits 109 and 108 at a predetermined maximum pressure. In the neutral position of the selector valve piston 127, however, the land 129 of this piston blocks the port 137 for the conduit 108, so that this fluid pressure does not pass through the selector valve 82 to any of the brakes or clutches in the transmission for engaging them. The driven shaft 11 is assumed to be stationary, and the pump 81 therefore provides no output fluid pressure in its conduit 95.

Ordinary forward driving by means of the illustrated transmission is done in drive range, in which the selector valve piston 127 is in its "D" position. In this position of the piston 127, driving is initially through the low speed power train, and a change in speed ratio to intermediate speed drive and finally to high speed drive is obtained as the speed of the vehicle increases, this upshifting action of the transmission being obtained due to the action of the governor 215 on the governor valve 83.

In the "D" position of the selector valve piston 127, regulated pump pressure from the conduit 108 is conducted by means of the groove 133 and ports 137 and 138 to the conduit 148, and fluid under pressure also flows through the groove 133 and port 142 to the conduit 145. The conduit 145 is connected with the servomotor 60 for the forward drive brake 17, and the brake 17 is thus applied by application of fluid pressure to the servo piston 63. The fluid pressure in the conduit 148 flows through the port 156 in the governor valve 83 but is blocked by the lands 151 and 152 of the governor piston 149 in the illustrated low speed position of the piston 149.

The fluid pressure in the conduit 145 is also applied to the low brake servo motor 61 through the shuttle valve 77, the fluid under pressure flowing through the port 173, the groove 168, the port 172 and the conduit 176 to the servomotor 61. Thus, both the brakes 17 and 18 are engaged, and the low speed forward drive through the transmission is completed. As has been previously described, the brake 17 takes the reaction from the sun gear 34 through the one-way device 39, and the brake 18 takes at least a part of the reaction from the sun gear 30, so that both brakes augment the action of each other in completing this drive, and the combined braking effect of the two brakes 17 and 18 is sufficient so that slippage of the brakes does not occur even with the high torque being transmitted from the torque converter 14 as the vehicle starts in low speed drive.

The driven shaft pump 81, as the driven shaft 11 begins rotation, delivers fluid to its discharge conduit 95, and draws fluid from the sump 90 through its inlet conduit 94. The driven shaft pump pressure in the conduit 95 is applied through the branch conduit 177 and the port 174 to the right end of the shuttle valve piston 162, tending to move the shuttle valve piston 162 toward the left against the action of the spring 169. When the speed of the vehicle and the fluid pressure output of the driven shaft pump 81 increase sufficiently, at approximately five or ten miles an hour vehicle speed in a certain embodiment of the invention, the fluid pressure applied to the right end of the piston 162 is sufficient to move the piston against the action of the spring 169 to close the port 173 and open the port 172 with respect to the port 171. Application of fluid pressure to the low speed brake servomotor 61 from the conduit 145 thus ceases, and fluid is drained from the servomotor 61 through the conduit 176, the port 172, the groove 168, the port 171, the conduit 144, the port 140, the groove 134 and the port 141 to the sump 90. Thus, at this time, after movement of the vehicle has started and the torque output of the hydraulic torque converter 14 has decreased in accordance with the well-known principles of operation of such converters, the brake 18 is disengaged, and the forward speed brake 17 is solely effective to take the reaction of the transmission gearing. The brake 17 is sufficient in effect to take this reaction due to the decrease in torque output of the torque converter 14.

The fluid pressure in the conduit 95 is impressed on the upper end of the valve piston 96 of the rear pump relief valve 85 through the conduit 123 and tends to move the valve piston 96 downwardly against the action of the spring 107. When the pressure in the conduit 95 has increased sufficiently, such movement of the piston 96 takes place, so that the land 99 of the piston 96 moves out of the cavity 106 to provide a cracking or small opening between the lower edge 106a of the cavity 106 and the upper edge 99a of the land 99 to thereby provide a limited communication between the bleed port 103 and the conduit 123. The valve piston 96 regulates the pressure to a predetermined maximum in the conduits 95 and 123, similar to the regulating action of the valve piston 113 of the pressure in the conduit 109 as previously described, tending to return to its illustrated position and close the communication between the ports 103 and 104 with any decline in pressure in the conduit 95 to reduce the fluid bleed to the sump through the port 103 and tending to open farther with any increase in pressure in the conduit 95 to increase the bleed to the sump. The valve piston 96, when so moved to vent the port 104 to the port 103 and regulate the perssure in the conduit 95, connects the ports 102 and 103, with no restriction, by means of its groove 100, and any fluid discharged by the pump 80 thus flows freely through the bleed port 103 in the valve 85 to thereby deactivate the drive shaft pump 80 and materially reduce the amount of power required for driving the pump 80. Under these conditions, with the driven shaft pump 81 supplying substantial fluid under pressure, the check valve 125 is opened by the fluid pressure in the conduits 95 and 123, with the ball 125 moving off its seat 126, and the regulated pressure in the conduits 123 and 108 is supplied by the driven shaft pump 81, exclusive of the drive shaft pump 80. Since the output conduit 91 of the drive shaft pump 80 is connected by means of the valve 85 with the bleed port 103, there is no fluid under pressure in the portion of the conduit 109 between the check valve 110 and the valve 85 tending to hold the check valve 110 open, and the check valve 110 closes with its ball moving on to the seat 112 to prevent any of the fluid in the conduit 108 draining through the groove 100 in the valve 85 and the bleed port 103 to the sump 90.

The torque converter 14 is supplied with fluid under pressure from the supply conduit 108 and the converter valve 78. The pressure in the conduit 108 flows through the conduit 199 and through the restriction 200 to the right end of the converter valve piston 185 and moves the piston 185 to the left as seen in Fig. 2 against the action of the spring 194, so that a limited amount of fluid may flow through the port 196, the groove 192, and the conduit 178 to the torque converter 14. The pressure in the conduit 178 applied to the torque converter passes through the passage 193 to the left end of the valve piston 185 to assist the spring 194 in moving the piston 185 to the right, tending to close the port 196, the net effect of the piston 185 being to supply fluid under a reduced pressure to the conduit 178 and the torque converter 14. There is a slight flow through the torque converter, the fluid being released from the torque converter by the passage (not shown) and valve (not shown). The converter supply conduit 178 is connected directly with the output conduit of the rear pump 81 by means of restricted conduit 179 and conduit 180, so that the rear pump gradually takes up the burden of supplying fluid through the hydraulic torque converter 14 prior to the time the piston of the rear pump relief valve 85 moves downwardly to relieve the front pump 80 and allow the rear pump to supply the fluid pressure for the system. A more stable movement and action of the valve 85 is thus obtained.

As the speed of the vehicle increases, the fly balls 217 tend to move outwardly to move the hub 220 toward the hub 219 against the action of the spring 221. This movement of the hub 220 causes a corresponding movement of the valve piston 149 into its second speed position in which the groove 154 connects the ports 156 and 157. The governor 215 as a whole, however, is changed in position in accordance with the movement given the accelerator 216, the governor being moved downwardly as seen in the figure by an increased depression of the accelerator and consequent increased opening of the engine throttle, so that a greater speed of the vehicle is necessary to cause this movement of the valve piston 149 with such accelerator depression. The movement of the governor valve piston 149 is thus under the combined control of the accelerator 216 and governor 215.

When the piston 149 is in its second speed position connecting the ports 156 and 157, the fluid pressure in the conduit 148 flows through these ports and the conduit 160 to the piston 53 of the second speed clutch 21 to engage this clutch, and the transmission is then in second speed forward drive.

The piston 163 of the shuttle valve 77 is connected by means of the conduit 184 with the conduit 160, so that the fluid pressure applied to the second speed clutch 21 is also applied to the piston 163. The pistons 163 and 162 are thus moved to the left against the action of the spring 169, so that the land 167 of the piston 162 blocks the port 173 as long as the second speed clutch 21 is engaged and prevents engagement of the brake 18 in intermediate drive even with substantial decreases in vehicle speed the port 173 being blocked, no fluid pressure from conduit 145 can pass through port 172 into conduit 176 to operate servo motor 61.

A change from second or intermediate to third speed drive is obtained when the speed of the vehicle increases still further with respect to the accelerator depression so that the governor 215 is effective to move the governor valve piston 149 into its third speed position in which it connects all three ports 156, 157 and 158. In the changed position of the valve piston, the groove 154 of the piston provides communication between the conduit 148 containing regulated fluid pressure and the conduit 161 for thereby applying regulated pump pressure to the clutch pressure plate 57. The clutch 20 will thus be applied, and the transmission will be in direct drive.

Low speed drive through the transmission is obtained by moving the manual selector valve piston 127 into its "L" position in which the groove 133 connects the ports 137 and 142 and the groove 135 connects the ports 139 and 140. The regulated fluid pressure in the conduit 108 is supplied through the port 137, the groove 133 and the port 142 to the conduit 145 and the forward brake servomotor 60, and the brake 17 is thus applied. The fluid pressure in the conduit 145 also passes through the port 173, the groove 168, and the port 172 in the shuttle valve 77 and through the conduit 176 to the servomotor 61 to the low lockup brake 18, engaging the brake 18 and providing a two-way drive between the torque converter 14 and the driven shaft 11. The fluid pressure in the conduit 145 also passes through the port 139, the port 140 and the conduit 144 to the port 170 of the shuttle valve to hold the valve piston 162 of the shuttle valve in its illustrated position connecting the ports 172 and 173, the fluid pressure on the left end of the valve piston 162 assisting the spring 169 and holding the piston in this position. The low speed brake 18 is thus maintained in engagement for the "L" position of the selector valve 82 regardless of increases in vehicle speed. The drive shaft pump 80 produces the fluid under pressure in the fluid supply conduit 108 for engaging the brakes 17 and 18 and keeping them engaged until the driven shaft pump 81 increases to a substantial speed, the same as when the vehicle is started and driven in drive range.

Reverse drive through the transmission is obtained by moving the manual selector valve piston 127 into its "R" position. In this position, the groove 133 in the piston 127 connects the ports 137, 136 and 143. The conduit 108 containing fluid pressure from the pump 80 is connected with the port 137, and fluid pressure is thus supplied to the conduits 147 and 146. For reverse drive, the fluid pressure in the conduit 108 is obtained from the drive shaft pump 80 exclusive of the driven shaft pump 81, since the latter pump rotates in the reverse direction and does not supply fluid to its outlet conduit 95. The fluid from the pump 80 flows through the conduits 91 and 109 to the fluid pressure supply conduit 108, and the front pump relief valve 84 is effective for limiting the pressure in these conduits to a predetermined maximum.

The fluid pressure in the conduit 147 connected with the conduit 108 by means of the valve piston 127 is supplied beneath the piston 113 and on the piston 115 of the front pump relief valve 84 through the port 118, and this fluid pressure is effective to augment the action of the spring 122, tending to move the valve piston 113 upwardly to decrease the amount of fluid flow between the upper end of the piston 113 and the edge of the port 119. The fluid pressure applied to the piston 113 is effective to supply this force to the piston, since the piston 113 is larger in diameter than the piston 115 on which the fluid pressure is also effective. The effect of this force on the front pump relief valve piston 113 is to increase the pressure in the conduit 109 and in the connected conduits to a substantially higher pressure than that existing in these conduits for the forward drives. The reverse brake 19 is applied by fluid pressure from the conduit 146 which is connected with the conduits 108 and 109 by means of the ports 143 and 137 and the piston groove 133, and this increased pressure is supplied to the reverse brake servomotor 62 and particularly to the pistons 66 and 67 in this servomotor for applying the reverse brake 19 with a braking force which is greater than would otherwise be obtained with the fluid pressure regulated to a lower value as is used for the forward speed drives. An engagement of the brake 19, as has been previously described, completes the reverse drive power train through the transmission, and the increased force of application on the brake 19 due to the increased fluid pressure functions to prevent slippage of the brake 19 due to the reaction on the brake which is greater than the reactions on the other brakes for the forward speed drives.

The pressure in the conduit 147 is supplied through the conduits 214 and 213 to the left end of the converter valve piston 188, and the piston 188 acts through the spring 194 on the converter valve piston 185 tending to close the port 196 by the land 191 of the piston 185. This port closing effect by the piston 185 has the net effect of maintaining the pressure in the torque converter 14 substantially the same as in the forward drives even though the pressure in the conduit 108 and connected conduits is raised, as just described, by the front pump relief valve 84.

The reverse interlock valve 79 has the pressure output of the driven shaft pump 81 impressed thereon through the conduit 95, the ports 104, the conduit 212 and the port 209, and when the pump 81 is being driven by the shaft 11 rotating in the forward direction, there is sufficient pressure applied to the piston 201 so that it is moved against the spring 207 to connect the ports 211 and 210 by means of the groove 206. Thus, when the selector valve piston 127 is moved into its reverse drive position to connect the ports 136, 143 and 137, with the vehicle moving forwardly at any substantial speed, the fluid from the conduit 108 is drained to the sump through the conduits 147 and 214, the ports 211 and 210 and the groove 206, so that fluid under pressure is not available for engaging the reverse brake 19. The reverse drive power train can thus not be completed when there is any substantial forward movement of the vehicle.

When the piston 149 of the governor valve 83 is moved into its second or intermediate speed position, assuming that the lower end of the lever 234 is in the notch 237, which condition exists when the accelerator is in an intermediate position between its fully closed and fully opened throttle positions, the latch 229 is moved about its pivot so that its land 230 lies beneath the bar 228. Subsequent unrestricted downward movement of the piston 149 is prevented by the latch even though the speed of the vehicle and thereby the governor 215 decreases.

The latch 229 is moved in a clockwise direction about its pivot by the lever 234 when the accelerator 216 is returned to its closed throttle position for moving the land 230 out from underneath the bar 228 to allow the piston 149 to return to its low speed position. As the accelerator is released from a partially throttle opened position, the rod 235 is moved upwardly so that the lower end of the lever 234 passes over the cam portion 239 on to the land 238. The cam portion 239 moves the lever 234 to release the land 230 from the bar 228, and the high land 238 holds the lever 229 in a bar releasing position.

When the vehicle speed increases sufficiently to move the bar 228 and the piston 149 into their third speed positions from their second speed positions, the latch 229 under the influence of the spring 232 swings counterclockwise about its pivot to move the land 231 beneath the bar 228. Subsequent movement of the piston 149 is prevented by the land 231 until the accelerator is either moved to its fully opened throttle position or to its fully closed throttle position. When the accelerator is moved to its fully opened throttle position, the rod 235 is moved downwardly as seen in its right hand showing in Fig. 1 to move the lower end of the lever 234 over the cam portion 240 on to the land 241. This causes sufficient swinging movement of the lever 229 clockwise so that its land 231 is released from the bar 228 allowing it and the piston 149 to move into the second speed position. The swinging movements of the lever 234 and latch 229 are not sufficient, however, under these conditions to release the bar 228 so that the piston 149 and bar 228 can move into their low speed positions, regardless of very low vehicle speeds.

Assuming that the vehicle is driving in high speed forward drive, when the accelerator is released to its closed throttle position, the lever 234 moves over the cam portion 239 on to the land 238, and the land 238 is sufficiently high so as to move the lever 234 and latch 229 sufficiently to completely release the bar 228 and allow the piston 149 to move back into its low speed position.

The piston 242 provides an additional influence in holding the piston 149 in its third speed position, once application of fluid pressure has been made to the piston 57 for the direct drive clutch 20. Under these conditions, fluid pressure exists in the port 158 and acts on the lower end of the piston 242, so that the piston 242 provides a force on the bar 228 tending to hold it in its high speed position. Thus, assuming the latch 229, and particularly its land 231, is not effective on the bar 228, either in the fully opened or fully closed throttle positions of the accelerator 216, the speed of the vehicle and thus of the governor 215 must decrease to lower values than required for moving the bar 228 and piston 149 into their high speed positions, for the same positions of the accelerator 216 respectively.

The latch 229 advantageously prevents a downshifting of the transmission under governor control from third speed to second speed until the accelerator is either moved into its closed throttle position or is moved into its opened throttle position, and the latch prevents a downshifting of the transmission into low speed ratio until the accelerator is in its closed throttle position. A downshifting of the transmission is thus under the direct control of the vehicle operator who can obtain the downshifting at the exact time he desires.

I wish it to be understood that my invention is not to be limited to the specific constructions and arrangements shown and described, except only insofar as the claims may be so limited, as it will be understood to those skilled in the art that changes may be made without departing from the principles of the invention.

I claim:

1. In a transmission for an automotive vehicle, the combination of a drive shaft, a driven shaft, means for providing a low speed power train between said shafts, means for providing an intermediate speed power train between said shafts, means for providing a high speed power train between said shafts, a governor responsive to the speed of said driven shaft, means under the control of said governor for changing the drive through the transmission from said low speed power train to said intermediate speed power train and subsequently to said high speed power train and vice versa as the speed of said driven shaft increases and decreases respectively, an accelerator for the vehicle movable between a throttle opening limit and a throttle closing limit, means for overruling the action of said governor so as to prevent a change from said high speed power train to said intermediate speed power train, means under the control of said accelerator for rendering said overruling means ineffective when said accelerator is at either one or the other of said limits of its movement, additional means for overruling the action of said governor so as to prevent a change from said intermediate speed power train to said low speed power train, and means under the control of said accelerator for rendering said additional overruling means ineffective when said accelerator is at one of said limits of its movement.

2. In a transmission for an automotive vehicle, the combination of a drive shaft, a driven shaft, means for providing a low speed power train between said shafts, means for providing an intermediate speed power train between said shafts, means for providing a high speed power train between said shafts, a governor responsive to the speed of said driven shaft, means under the control of said governor for changing the drive through the transmission from said low speed power train to said intermediate speed power train and subsequently to said high speed power train and vice versa as the speed of said driven shaft increases and decreases respectively, an accelerator for the vehicle, means for overruling the action of said governor so as to prevent a change from said high speed power train to said intermediate speed power train, means under the control of said accelerator for rendering said overruling means ineffective only when said accelerator is at fully opened or fully closed throttle position, additional means for overruling the action of said governor so as to prevent a change from said intermediate speed power train to said low speed power train, and means under the control of said accelerator for rendering said additional overruling means ineffective only when said accelerator is at fully closed throttle position.

3. In a transmission for an automotive vehicle, the combination of an accelerator for the vehicle, a drive shaft, a driven shaft, means for providing a low speed power train between said shafts, means for providing an intermediate speed power train between said shafts, means for providing a high speed power train between said shafts, a governor responsive to the speed of said driven shaft, a control member having low, intermediate and high speed positions and controlling changes between said power trains and connected with said governor so that said governor causes changes from the low to the intermediate to the high speed power trains and vice versa as the speed of the driven shaft increases and decreases respectively, a latch for holding said control member in its intermediate and high speed positions once the control member has been moved into these positions under the action of said governor, and means under the control of said accelerator for releasing said latch to allow the control member to move back into its intermediate speed position when the accelerator is in fully opened or fully closed throttle positions, said last named means also allowing the control member to move back into its low speed position when the accelerator is released to closed throttle position.

4. In a transmission for an automotive vehicle, the combination of an accelerator for the vehicle, a drive shaft, a driven shaft, means for providing a low speed power train between said shafts, a governor responsive to the speed of said driven shaft, a control member having low and intermediate and high speed positions and controlling changes between said power trains and connected with said governor so that the governor causes changes from the low to the intermediate to the high speed power trains and vice versa as the speed of the driven shaft increases and decreases respectively, a latch having a first land for holding said control member in its intermediate speed position and a second land for holding said control member in its high speed position once the control member has been moved into these positions under the action of said governor, and means under the control of said accelerator for releasing said second land of said latch with respect to said control member so as to allow said control member to move from its high speed position to its intermediate speed position when the accelerator is either at a fully opened or at a closed throttle position, said last named means also being effective for releasing the first land of said latch so as to allow the control member to move from its intermediate speed position to its low speed position when the accelerator is in its closed throttle position.

5. In a transmission for an automotive vehicle, the combination of an accelerator for the vehicle, a drive shaft, a driven shaft, means for providing a low speed power train between said shafts, means providing an intermediate speed power train between said shafts and including a fluid pressure operated clutch, means for providing a high speed power train between said shafts and including a fluid pressure operated clutch, a source of fluid pressure, a control valve having a low speed position and an intermediate speed position and a high speed position and connecting said pressure source with said first-named clutch in its intermediate speed position and with said second-named clutch in its high speed position, a governor driven by said driven shaft and connected with said control valve for moving said valve from its low to its intermediate and subsequently to its high speed positions and vice versa with increasing and decreasing speeds of said drive shaft respectively, a latch having a first land for holding said control valve in its intermediate speed position and a second land for holding said control valve in its high speed position once the governor has moved the valve into these positions, and a cam mechanism effective on said latch and under the control of said accelerator to release said second land of said latch so as to allow movement of the control valve from its high to its intermediate speed positions when the accelerator is in either an open throttle or a closed throttle position, and effective to release said first land of said latch so as to allow movement of said valve from its intermediate speed position to its low speed position when the accelerator is in its closed throttle position.

References Cited in the file of this patent

UNITED STATES PATENTS

| 1,818,910 | Sanine | Aug. 11, 1931 |
| 1,886,003 | Garrison | Nov. 1, 1932 |
| 2,051,553 | Fleischel | Aug. 16, 1936 |
| 2,051,917 | Thompson | Aug. 25, 1936 |
| 2,071,292 | Wollson | Feb. 16, 1937 |
| 2,644,559 | Randol | July 7, 1953 |
| 2,720,124 | Polomski | Oct. 11, 1955 |

FOREIGN PATENTS

| 1,018,461 | France | Oct. 15, 1952 |
| 1,047,683 | France | July 29, 1953 |